No. 702,969. Patented June 24, 1902.
W. A. KNIGHT.
WAREHOUSE TRUCK.
(Application filed Jan. 13, 1902.)
(No Model.)
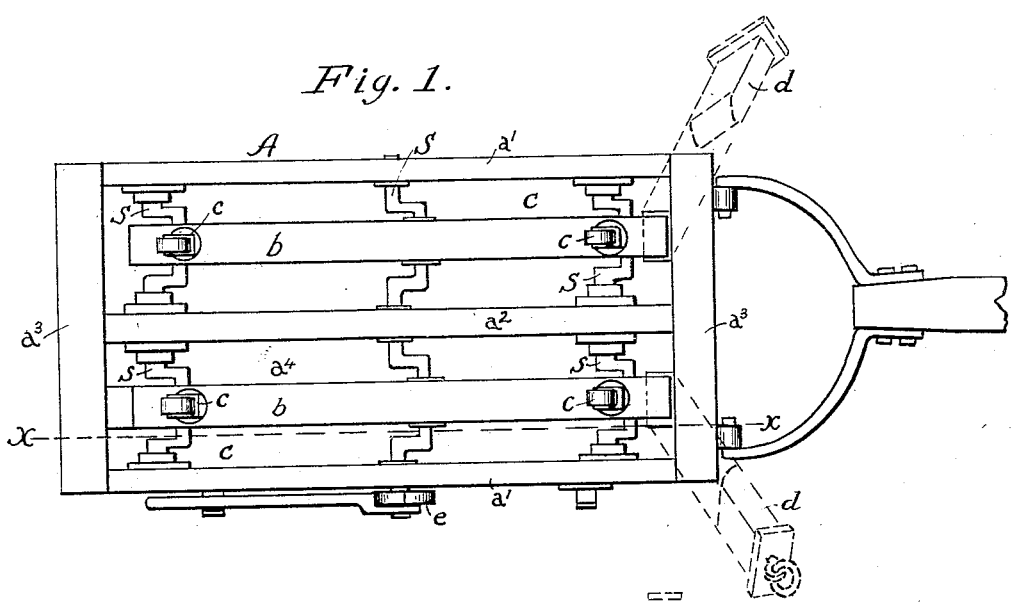
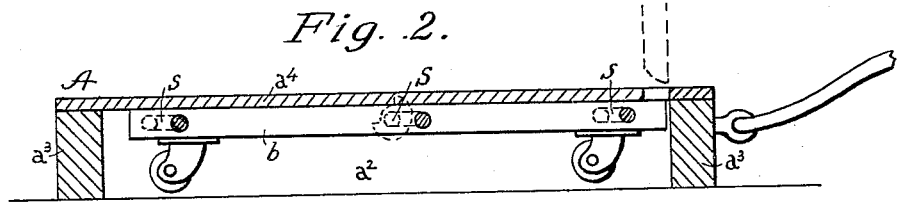
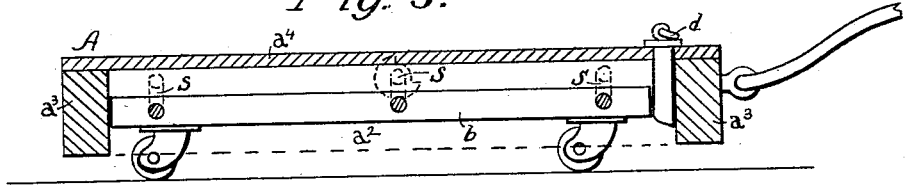
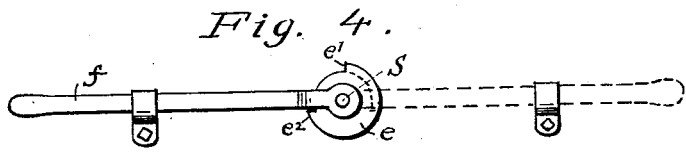
Witnesses.
William M. Dunbar
Chas. Herbert Jones
Inventor
Walter A. Knight
by L. M. Hosea atty.

UNITED STATES PATENT OFFICE.

WALTER A. KNIGHT, OF MADISONVILLE, OHIO.

WAREHOUSE-TRUCK.

SPECIFICATION forming part of Letters Patent No. 702,969, dated June 24, 1902.

Application filed January 13, 1902. Serial No. 89,458. (No model.)

*To all whom it may concern:*

Be it known that I, WALTER A. KNIGHT, a citizen of the United States, residing at Madisonville, in the county of Hamilton and State of Ohio, have invented new and useful Improvements in Warehouse-Trucks, of which the following is a specification.

My invention relates to trucks intended more particularly for use in machine-shops, tobacco-packing warehouses, and other situations where heavy packages are to be moved and manipulated while on the truck.

The object of my invention is to produce a truck adapted to be moved in any direction with a heavy load, which may also be used at will as a platen or solid basis for any treatment of the object carried—such, for example, as packing hogsheads of tobacco or other merchandise. Within these general purposes it is also intended to secure a durable and simple construction adapted to use by the rough labor employed in packing tobacco and in other industries of a like character in this respect.

To this end the invention consists of a platform provided with caster-wheels or other suitable running-gear mounted on movable bars secured to the platform by crank-supports and adapted thereby to be moved in the arc of a circle outward in constant parallelism with the platform, with abutments for preventing the end thrust of the stringers when the running-gear is in use, and in the construction and arrangement of the several features to secure economy of construction, simplicity, and durability.

My invention is illustrated in the accompanying drawings, in which—

Figure 1 is an under plan view of a truck shown with the running-gear receded within the under plane of the bottom of the truck-beams and showing the thrust-blocks in perspective withdrawn, this being the arrangement of the truck when used as a pressure-platen; Fig. 2, a fore-and-aft vertical section in the line $xx$ of Fig. 1, showing the parts in the same position as in Fig. 1; Fig. 3, a similar section showing the running-gear protruded for use in moving the truck on its wheels, and Fig. 4 a detail side view of the operating-lever and shaft connection.

Referring now to the drawings, the truck-platform A rests upon two fore-and-aft outer stringers $a'$ $a'$ and one or more intermediate stringers $a^2$, secured by cross-braces $a^3$ $a^3$ at the ends, supporting a floor $a^4$, all integral parts of the general truck-platform A. Between and parallel with the intermediate and outer stringers at each side are arranged supporting-bars $b$, (there being two in the present case,) each carrying near each end a caster or bearing wheel $c$. Each supporting-bar $b$ is engaged with the adjacent stringer at each side by a short crank-shaft $s$ at or near the outer ends of the bar $b$, whereby each bar forms a connecting-rod or "parallel rod," uniting its crank-supports $s$, and is itself confined to an outward-and-inward motion always parallel with the horizontal plane of the platform A in the arc of a circle. In the case illustrated the cranks are of such length as to swing in a quarter-circle, so that when the bar $b$ is at its extreme outward position the crank-arms stand substantially perpendicular thereto, and thus support the platform A with least strain to themselves, as in the latter position the caster-wheels are thrust beyond the bottom plane of the platform A and lift the same from the floor, and thus movably support it and any load upon it, as shown in Fig. 3. The bars $b$ are preferably of such length and the crank-shafts $s$ so arranged as that when the bars $b$ are thus thrust outward they are carried backward to contact with the rear cross-brace $a^3$ as an abutment limiting further movement and holding the running-gear in rigid connection with the platform as against any strains caused by drawing or pushing the platform forward on an uneven floor. I employ a bolt or other suitable fastening to secure the bars $b$ against strains in the opposite direction, a preferable form of fastening being thrust-blocks $d$, which are dropped down between the rear side of the front cross-brace $a^3$ and the front ends of the bars $b$, thus holding the entire running-gear rigid in both directions with the platform while carried on the bearing-wheels. These thrust-blocks $d$ are to be removed when the platform is to be dropped down upon the floor, as shown in Figs. 1 and 2.

To elevate and depress the platform, I preferably employ a single continuous double-crank shaft S, passing from side to side centrally through the platform-stringers $a'$ $a^2$ and the bars $b$, the cranks being of same length of arm as the supporting-cranks $s$. By the partial rotation of the shaft S the motion is transmitted to the bars $b$ simultaneously and its supporting-cranks $s$ are moved outward correspondingly. When in final outward position, as in Fig. 3, the blocks $d$ are dropped into place and the running-gear held rigid, supporting the platform upon the crank-supports $s$ in perpendicular relations without torsional strains.

In order to conveniently raise and lower the platform as described, I may extend the outer terminals of the crank-shaft S at either or both ends into hand-levers; but preferably I attach at one or both the outer terminals of the crank-shaft S a small wheel $e$, provided with spurs or teeth $e'$ $e^2$, and adjacent to it upon the same shaft is loosely pivoted a hand-lever $f$, formed with a projection engaging the spurs $e'$ $e^2$, one in each direction. The arrangement is indicated in Fig. 4, the lever lying horizontally against the outer edge of the platform. On being moved upward to the perpendicular it engages the spur $e'$, and continuing the movement to the position shown in dotted lines it rotates the shaft S the required quarter-revolution to place the parts in position shown in Fig. 3. By a reversal of the movement the lever engages spur $e^2$ and moves the platform downward to its seat upon the floor, as in Fig. 2. Thus in its ultimate positions the lever lies in suitable catches parallel with the side brace $a'$ out of the way and forms no obstruction to the free use of the platform. The lever attachment may be used at one end of the crank-shaft S or both, as may be desired.

It will be obvious that the central crank-shaft S may be dispensed with as an independent feature and a similar continuous crank-shaft substituted for the smaller crank-shafts at each end and the lever attachment used upon the outer terminals of each; but I prefer the arrangement shown, inasmuch as it requires but one forged crank-shaft and lever attachment and permits a cheaper form of casting to be used for the supports $s$, besides requiring a single lifting-lever, whereby a single person can operate the device.

I claim as my invention and desire to secure by Letters Patent of the United States—

1. An adjustable truck embodying a platform of longitudinal stringers and cross-braces at the ends thereof; running-gear including longitudinal bars and crank-shafts at the ends thereof and connecting the same with the platform, and provided with bearing-wheels; means for raising and lowering the running-gear relative to the platform said platform having one of its end braces serving as an abutment for preventing end thrust of the running-gear in one direction, when the latter is in use; and thrust-blocks adapted to be inserted between the bars and the other cross-brace of the platform for holding the running-gear from movement in an opposite direction.

2. In an adjustable platform-truck, the combination, with the platform of parallel bars carrying the bearing-wheels each bar being carried upon and connected with the platform by corresponding crank-shafts, and an intermediate double crank-shaft lying substantially in the horizontal plane of the other crank-shafts and passing centrally through the parallel bars and connecting the bars and platform-stringers and by its rotation actuating the bars in unison in parallelism with the platform, substantially as set forth.

3. In a device of the character indicated in combination with the platform and running-gear mounted thereon and including parallel longitudinal bars and crank-shafts at the ends thereof, the actuating crank-shaft, passing centrally through the parallel bars and the platform-stringers and lying substantially in the horizontal plane of the other crank-shafts, the terminal spur-wheel fixed to the central shaft, and the actuating-lever loosely centered on the shaft and engaging the spur-wheel, substantially as set forth.

In testimony whereof I have hereunto set my hand in presence of two subscribing witnesses.

WALTER A. KNIGHT.

Witnesses:
CHAS. HERBERT JONES,
LLOYD T. BRUNSON.